(12) United States Patent
Omi (10) Patent No.: US 12,420,822 B2
(45) Date of Patent: Sep. 23, 2025

(54) DATA TRANSMITTER AND METHOD FOR DATA TRANSMISSION

(71) Applicants: TOYOTA JIDOSHA KABUSHIKI KAISHA, Toyota (JP); AISIN CORPORATION, Aichi (JP)

(72) Inventor: Takuhiro Omi, Anjo (JP)

(73) Assignees: TOYOTA JIDOSHA KABUSHIKI KAISHA, Toyota (JP); AISIN CORPORATION, Aichi (JP)

( * ) Notice: Subject to any disclaimer, the term of this patent is extended or adjusted under 35 U.S.C. 154(b) by 99 days.

(21) Appl. No.: 18/420,864

(22) Filed: Jan. 24, 2024

(65) Prior Publication Data

US 2024/0300508 A1    Sep. 12, 2024

(30) Foreign Application Priority Data

Mar. 7, 2023   (JP) ................................ 2023-034566

(51) Int. Cl.
*B60W 50/14* (2020.01)
*B60W 40/08* (2012.01)
(Continued)

(52) U.S. Cl.
CPC ............ *B60W 50/14* (2013.01); *B60W 40/08* (2013.01); *B60W 60/0059* (2020.02); *G06V 20/597* (2022.01); *G06V 40/161* (2022.01); *B60W 2040/0827* (2013.01); *B60W 2050/146* (2013.01); *B60W 2420/403* (2013.01); *B60W 2540/229* (2020.02); *B60W 2556/45* (2020.02)

(58) Field of Classification Search
CPC .. B60W 50/14; B60W 40/08; B60W 60/0059; B60W 2040/0827; B60W 2050/146; B60W 2420/403; B60W 2540/229; B60W 2556/45; G06V 20/597; G06V 40/161
See application file for complete search history.

(56) References Cited

U.S. PATENT DOCUMENTS 10,671,069 B2 *   6/2020  Son ....................... G01C 21/362
10,962,378 B2 *   3/2021  Cronin ................... G08G 1/202
(Continued)

FOREIGN PATENT DOCUMENTS

JP        H10210440 A     8/1998
JP        2006254055 A    9/2006
(Continued)

*Primary Examiner* — Mohamed Barakat
(74) *Attorney, Agent, or Firm* — Dickinson Wright, PLLC (57) ABSTRACT

A data transmitter to be mounted on a vehicle detects the driver's state from output data of a camera mounted on the vehicle. The data transmitter determines whether the driver's state is suitable for continuing the control by the level of autonomous driving; transmits, when it is determined that the state is suitable for continuing the control, the face image to a terminal communicably connected via a communication network, together with a first setting for displaying the face image on the terminal in first mode; and transmits, when it is determined that the state is unsuitable for continuing the control, the face image to the terminal, together with a second setting for displaying the face image on the terminal in second mode that draws more attention of a user of the terminal than the first mode.

5 Claims, 5 Drawing Sheets

(51) Int. Cl.
    *B60W 60/00*     (2020.01)
    *G06V 20/59*     (2022.01)
    *G06V 40/16*     (2022.01)

(56) References Cited

U.S. PATENT DOCUMENTS

| | | | | |
|---|---|---|---|---|
| 2015/0328985 | A1* | 11/2015 | Kim | A61B 5/746 |
| | | | | 180/272 |
| 2019/0318151 | A1* | 10/2019 | Shichijo | G06V 10/761 |
| 2021/0300317 | A1* | 9/2021 | Ueda | B60W 60/005 |
| 2021/0403004 | A1* | 12/2021 | Alvarez | G06V 20/597 |
| 2022/0172652 | A1* | 6/2022 | Yagyu | G09G 3/001 |
| 2022/0289249 | A1* | 9/2022 | Imai | B60K 35/85 |

FOREIGN PATENT DOCUMENTS

| | | | |
|---|---|---|---|
| JP | 2016213791 A | 12/2016 | |
| JP | 2019195121 A | 11/2019 | |

\* cited by examiner

DATA TRANSMITTER AND METHOD FOR DATA TRANSMISSION

FIELD

The present disclosure relates to a data transmitter and a method for data transmission to a terminal via a communication network.

BACKGROUND

Japanese Unexamined Patent Publication No. 2019-195121 (hereafter "Patent Literature 1") describes an information processing device used for a conference call among participants in different locations. The information processing device described in Patent Literature 1 estimates a load of work other than a conference call performed in parallel with the conference call by a participant in the conference call, and informs other participants in the conference call of information on the estimated load. The information processing device described in Patent Literature 1 can prevent a heavy load of driving a vehicle from being further increased by a conference call, when a driver of the vehicle participates in the conference call.

SUMMARY

In a vehicle driven by a level of autonomous driving in which the driver need not be alert, e.g., level 3 autonomous driving defined by the Society of Automotive Engineers (SAE), the driver is released from driving and can do secondary activities, such as videoconferencing, watching television, and using a smartphone.

A change in surrounding environment may cause travel control of a vehicle to change, for example, to a level of autonomous driving in which the driver is alert, e.g., level 2 autonomous driving defined by SAE. In a vehicle driven by a level of autonomous driving in which the driver is alert, the driver is required to be alert to driving conditions and to drive the vehicle as necessary.

If the driver is in a condition in which he/she cannot be alert to driving conditions appropriately at a change of travel control of a vehicle from a level of autonomous driving in which the driver need not be alert to another level of autonomous driving in which the driver needs to be alert, the vehicle cannot be appropriately driven, which may result in failure to continue travel by autonomous driving.

It is an object of the present disclosure to provide a data transmitter that can continue travel by autonomous driving more appropriately.

The following is a summary of the present disclosure.

(1) A data transmitter to be mounted on a vehicle under travel control by a level of autonomous driving in which a driver need not be alert, the data transmitter including a processor configured to:
 detect the driver's state from output data of an interior sensor mounted on the vehicle, the interior sensor including a camera that outputs a face image representing the driver's face;
 determine whether the driver's state is suitable for continuing the control by the level of autonomous driving;
 transmit, when it is determined that the state is suitable for continuing the control, the face image to a terminal communicably connected via a communication network, together with a first setting for displaying the face image on the terminal in first mode; and
 transmit, when it is determined that the state is unsuitable for continuing the control, the face image to the terminal, together with a second setting for displaying the face image on the terminal in second mode that draws more attention of a user of the terminal than the first mode.

(2) The data transmitter according to aspect (1), wherein the processor
 further outputs a suitability level indicating how much the state is suitable for continuing the control, in the determination, and
 further transmits, to the terminal, level data for displaying the suitability level on the terminal, in the transmission.

(3) The data transmitter according to aspect (1) or (2), wherein in the detection, the processor detects a looking direction or a face orientation of the driver from the face image, determines a waking level of the driver, based on the looking direction or the face orientation, and detects the state, depending on the waking level.

(4) A method for data transmission executed by a data transmitter mounted on a vehicle under travel control by a level of autonomous driving in which a driver need not be alert, the method including:
 detecting the driver's state from output data of an interior sensor mounted on the vehicle, the interior sensor including a camera that outputs a face image representing the driver's face;
 determining whether the driver's state is suitable for continuing the control by the level of autonomous driving;
 transmitting, when it is determined that the state is suitable for continuing the control, the face image to a terminal communicably connected via a communication network, together with a first setting for displaying the face image on the terminal in first mode; and
 transmitting, when it is determined that the state is unsuitable for continuing the control, the face image to the terminal, together with a second setting for displaying the face image on the terminal in second mode that draws more attention of a user of the terminal than the first mode.

(5) A non-transitory computer-readable medium storing a computer program for data transmission causing a computer mounted on a vehicle to execute a process, the vehicle being under travel control by a level of autonomous driving in which a driver need not be alert, the process including:
 detecting the driver's state from output data of an interior sensor mounted on the vehicle, the interior sensor including a camera that outputs a face image representing the driver's face;
 determining whether the driver's state is suitable for continuing the control by the level of autonomous driving;
 transmitting, when it is determined that the state is suitable for continuing the control, the face image to a terminal communicably connected via a communication network, together with a first setting for displaying the face image on the terminal in first mode; and
 transmitting, when it is determined that the state is unsuitable for continuing the control, the face image to the terminal, together with a second setting for displaying the face image on the terminal in second mode that draws more attention of a user of the terminal than the first mode.

The data transmitter according to the present disclosure can continue travel by autonomous driving more appropriately.

DESCRIPTION OF EMBODIMENTS

A data transmitter that can continue travel by autonomous driving more appropriately will now be described in detail with reference to the attached drawings. The data transmitter is to be mounted on a vehicle under travel control by a level of autonomous driving in which a driver need not be alert. The data transmitter detects the driver's state from output data of an interior sensor mounted on the vehicle, and determines whether the driver's state is suitable for continuing the control by the level of autonomous driving. The interior sensor includes a camera that outputs a face image representing the driver's face. When it is determined that the state is suitable for continuing the control, the data transmitter transmits the face image to a communication network, together with a first setting for displaying the face image in first mode on a terminal communicably connected via the communication network. When it is determined that the state is unsuitable for continuing the control, the data transmitter transmits the face image to the communication network, together with a second setting for displaying the face image on the terminal in second mode that draws more attention of a user of the terminal than the first mode.

Figure 1:
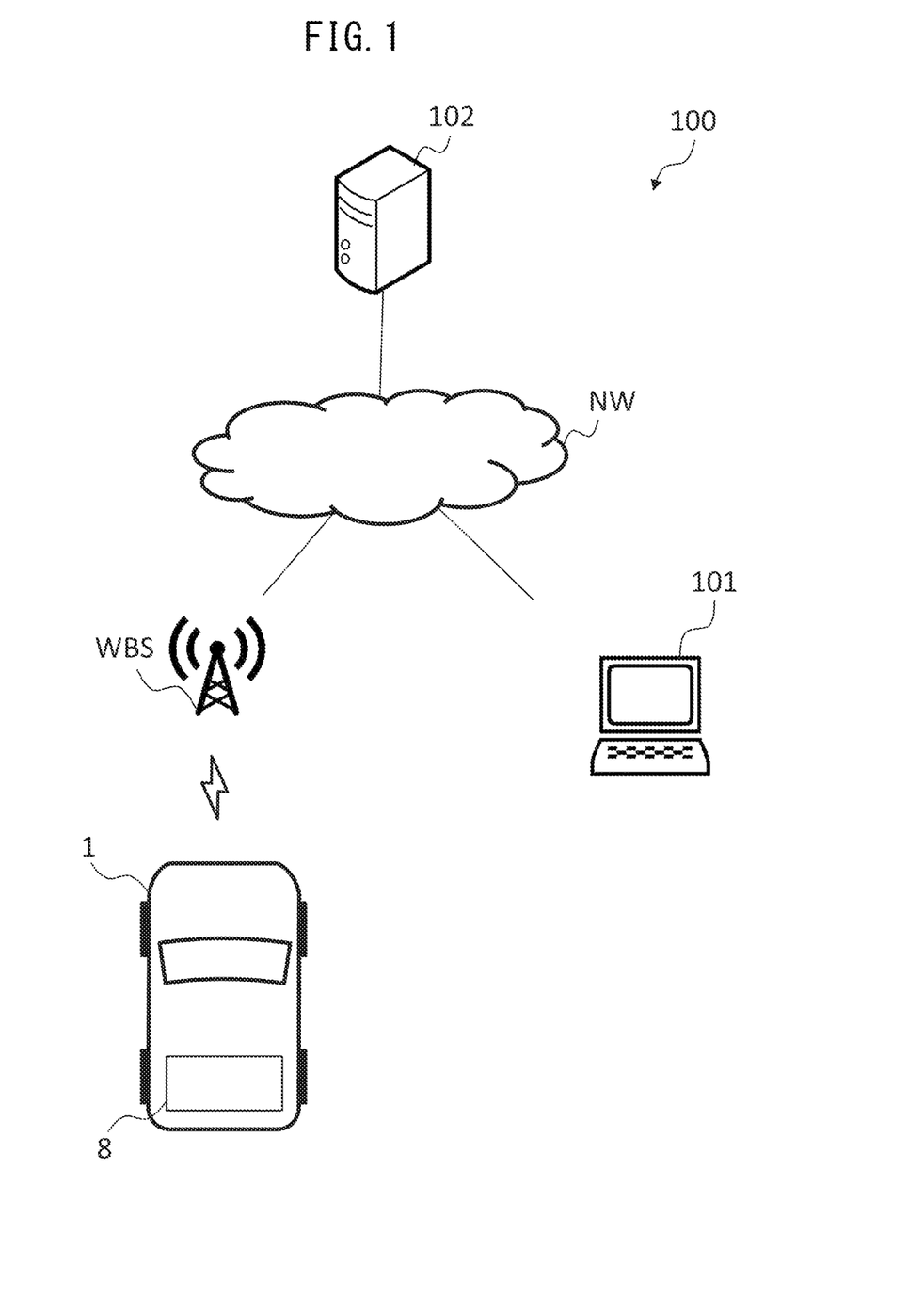
FIG. 1 schematically illustrates the configuration of a videoconference system.

FIG. 1 schematically illustrates the configuration of a videoconference system. The videoconference system 100 includes a terminal 101, a videoconference server 102, and a vehicle 1 equipped with a data transmitter 8.

The terminal 101 is communicably connected to the videoconference server 102 via a communication network. The terminal 101 and the videoconference server 102 are each a computer including a communication interface, a memory, and a processor. The configuration of the data transmitter 8 will be described below.

The vehicle 1 accesses a wireless base station WBS, which is connected to the communication network NW, for example, via a gateway (not illustrated), thereby communicably connecting to the videoconference server 102 via the wireless base station WBS and the communication network NW.

The data transmitter 8 of the vehicle 1 transmits display data for displaying a predetermined image on the terminal 101 to the videoconference server 102 via the communication network NW. The videoconference server 102 transmits display data received from the vehicle 1 to the terminal 101 via the communication network NW. The terminal 101 displays the predetermined image on its display, based on display data received from the videoconference server 102.

Similarly, display data transmitted from the terminal 101 via the videoconference server 102 to the vehicle 1 may be displayed in the vehicle 1. In addition to display data, voice data may be transmitted and received between the terminal 101 and the vehicle 1. Alternatively, the videoconference system 100 may be configured so that the terminal 101 and the data transmitter 8 transmit and receive data via the communication network NW without the videoconference server 102.

Figure 2:
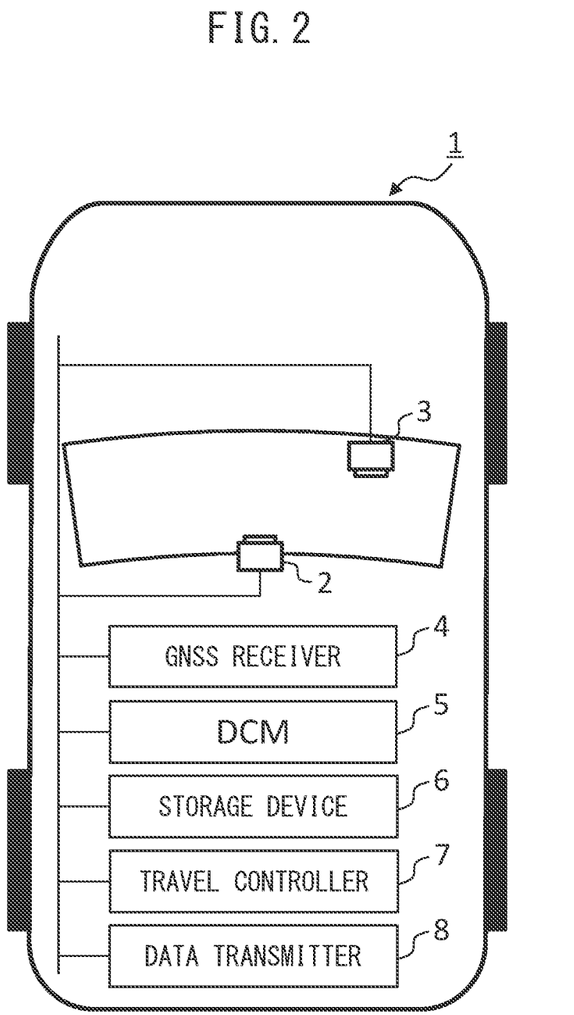
FIG. 2 schematically illustrates the configuration of a vehicle equipped with a data transmitter.

FIG. 2 schematically illustrates the configuration of the vehicle 1 equipped with the data transmitter.

The vehicle 1 includes a surrounding area camera 2, a driver monitoring camera 3, a global navigation satellite system (GNSS) receiver 4, a data communication module (DCM) 5, a storage device 6, and a travel controller 7, in addition to the data transmitter 8. The surrounding area camera 2, the driver monitoring camera 3, the GNSS receiver 4, the data communication module 5, and the storage device 6 are communicably connected to the travel controller 7 and the data transmitter 8 via an in-vehicle network conforming to a standard such as a controller area network. The travel controller 7 is also communicably connected to the data transmitter 8 via the in-vehicle network.

The surrounding area camera 2 is an example of a surrounding area sensor that generates surrounding area data representing the surroundings of the vehicle 1. The surrounding area camera 2 includes a two-dimensional detector constructed from an array of optoelectronic transducers, such as CCD or C-MOS, having sensitivity to visible light and a focusing optical system that forms an image of a target region on the two-dimensional detector. The surrounding area camera 2 is disposed, for example, in a front upper area in the vehicle interior and oriented forward. The surrounding area camera 2 takes a picture of the surroundings of the vehicle 1 through a windshield every predetermined capturing period (e.g., 1/30 to 1/10 seconds), and outputs area images representing the surroundings as surrounding area data. As a surrounding area sensor, the vehicle 1 may include a sensor other than the surrounding area camera 2, e.g., a light detection and ranging (LiDAR) sensor that generates a range image whose pixels each have a value depending on the distance to an object represented in the pixel, as surrounding area data, based on the surroundings of the vehicle 1.

The driver monitoring camera 3, which is an example of the interior sensor that generates an output signal representing the condition of the driver of the vehicle. The driver monitoring camera 3 includes a two-dimensional detector constructed from an array of optoelectronic transducers, such as CCD or C-MOS, having sensitivity to infrared light, a focusing optical system that forms an image of a target region on the two-dimensional detector, and a light source that emits infrared light. The driver monitoring camera 3 is mounted, for example, in a front area in the vehicle interior and oriented toward the face of the driver sitting on the driver's seat. The driver monitoring camera 3 irradiates the driver with infrared light every predetermined capturing period (e.g., 1/30 to 1/10 seconds), and outputs time-series face images representing the driver's face. As the interior sensor, the vehicle 1 may include an angle sensor that outputs the reclining angle of the driver's seat.

The GNSS receiver 4, which is an example of a position determining sensor, receives GNSS signals from GNSS satellites every predetermined period, and determines the position of the vehicle 1, based on the received GNSS signals. The GNSS receiver 4 outputs a positioning signal indicating the result of determination of the position of the vehicle 1 based on the GNSS signals to the data transmitter 8 via the in-vehicle network every predetermined period.

The data communication module 5, which is an example of a vehicle communication unit, is a device to execute a wireless communication process conforming to a predetermined wireless communication standard, such as "4G (4th Generation)" or "5G (5th Generation)." The data communication module 5 passes data included in a radio signal received from the videoconference server 102 to the data transmitter 8. Further, the data communication module 5 includes data received from the data transmitter 8 in an uplink radio signal, and transmits the radio signal to the videoconference server 102. The data communication module 5 may be mounted as part of the travel controller 7 or the data transmitter 8.

The storage device 6, which is an example of a storage unit, includes, for example, a hard disk drive or a nonvolatile semiconductor memory. The storage device 6 stores a high-precision map, which includes, for example, information indicating lane lines dividing lanes in a predetermined region represented in the high-precision map.

The travel controller 7, which is an example of an autonomous driving system, is an electronic control unit (ECU) including a communication interface, a memory, and a processor. The travel controller 7 reads out information on lane lines around the position of the vehicle indicated by a positioning signal received from the GNSS receiver 4, from the storage device 6, which stores a high-precision map. The travel controller 7 detects lane lines in the surroundings by inputting an area image received from the surrounding area camera 2 into a classifier, and matches them to lane lines in the high-precision map to identify a lane being traveled by the vehicle 1. The travel controller 7 detects an object in the surroundings, such as a vehicle, by inputting an area image received from the surrounding area camera 2 into a classifier, and generates a trajectory so as to keep a predetermined distance from the object and to keep the lane or change lanes, depending on the circumstances. To travel along the trajectory, the travel controller 7 outputs a control signal to a travel mechanism (not illustrated) of the vehicle 1. The travel mechanism includes, for example, an engine or a motor for powering the vehicle 1, brakes for decelerating the vehicle 1, and a steering mechanism for steering the vehicle 1.

The classifier may be, for example, a convolutional neural network (CNN) including convolution layers connected in series from the input side toward the output side, such as You Only Look Once (YOLO) or Single Shot MultiBox Detector (SSD). A CNN that has been trained with input of a large number of images representing lane lines or objects to be detected, such as pedestrians and vehicles, used as training data operates as a classifier that detects lane lines or an object and that outputs regions representing the lane lines or an object region representing the object in an image and the type of the object.

The travel controller 7 can control travel of the vehicle 1 by a level of autonomous driving in which the driver is not alert (e.g., level 3 autonomous driving defined by SAE) under a predetermined condition, e.g., a condition that the vehicle speed is within a predetermined range or motion of traffic participants in the surroundings is not complicated. During travel control of the vehicle 1 by level 3 autonomous driving, the driver can do secondary activities other than driving (e.g., videoconferencing, watching television, and using a smartphone).

When the condition of travel control by level 3 autonomous driving is no longer satisfied, the travel controller 7 requests the driver to take over at least some of tasks related to travel of the vehicle 1, such as being alert to the surroundings and controlling the travel mechanism. When the driver is in a state in which he/she cannot speedily take over a task requested by the travel controller 7, the travel controller 7 executes control such as decelerating the vehicle 1 and stopping it in a safe place, e.g., on a road shoulder, to ensure safety of the vehicle 1. Therefore, to continue travel control by autonomous driving appropriately, it is preferable that the driver maintain a state that enables taking over a task speedily, e.g., a state in which the waking level is sufficiently high or the seat is not reclined too much, even when the vehicle 1 is driven by a level of autonomous driving in which the driver need not be alert to the surroundings. In other words, the driver's state that enables taking over a task speedily is suitable for continuing travel control by a level of autonomous driving in which the driver need not be alert to the surroundings.

The data transmitter 8 is an ECU including a communication interface 81, a memory 82, and a processor 83. The data transmitter 8 detects the driver's state from a face image generated by the driver monitoring camera 3, and transmits the face image to the terminal 101 via a data communication module, together with a setting for displaying that is determined depending on the detected driver's state. The travel controller 7 and the data transmitter 8 may be implemented in the same ECU.

Figure 3:
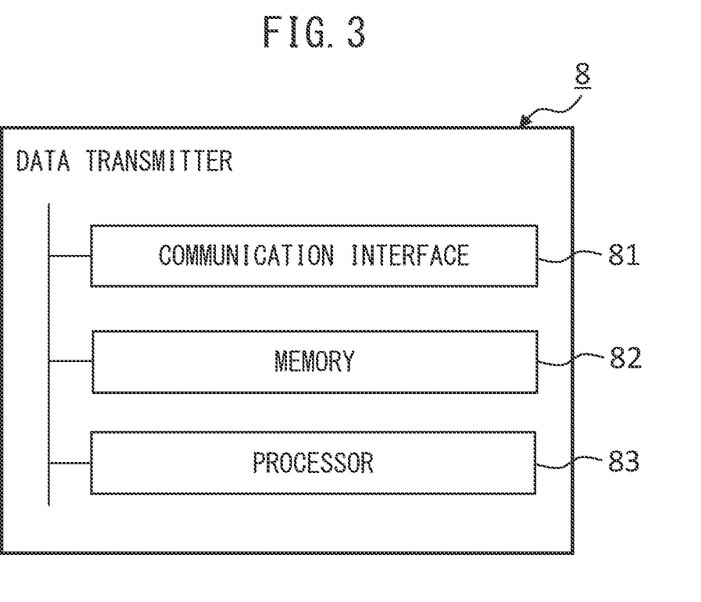
FIG. 3 schematically illustrates the hardware of the data transmitter.

FIG. 3 schematically illustrates the hardware of the data transmitter 8.

The communication interface 81, which is an example of a communication unit, includes a communication interface circuit for connecting the data transmitter 8 to the in-vehicle network. The communication interface 81 provides received data for the processor 83, and outputs data provided from the processor 83 to an external device.

The memory 82 includes volatile and nonvolatile semiconductor memories.

The memory 82 stores various types of data used for processing by the processor 83, e.g., a determination rule representing the relationship between a driver's state detected from a face image and a suitability level indicating how much the state is suitable for continuing travel control by a predetermined level of autonomous driving. The determination rule is made so that a state of a driver that enables taking over a task more speedily is associated with a higher suitability level. For example, it is difficult for a driver whose waking level is low to take over a task speedily. Therefore, when the waking level is detected as the driver's state, the memory 82 may store a determination rule in which a higher waking level of a driver is associated with a higher suitability level. Additionally, it is difficult for a driver who has reclined the seat greatly to take over a task speedily. Therefore, when the reclining angle of the seat is detected as the driver's state, the memory 82 may store a determination rule in which a smaller reclining angle of the seat is associated with a higher suitability level.

The memory 82 also stores a first setting for displaying a face image on the terminal 101 in first mode, and a second setting for displaying a face image on the terminal 101 in second mode that draws more attention of a user of the terminal 101 than the first mode. In the second mode, a face image may be displayed in a size greater than a display size of a face image in the first mode. In the second mode, a face image may be displayed with a more conspicuous outline (e.g., 4.5 points thick and/or yellow) than an outline of a face image in the first mode (e.g., 1.5 points thick and/or blue).

The memory 82 also stores various application programs, e.g., a data transmission program for executing a data transmission process.

The processor 83, which is an example of a control unit, includes one or more processors and a peripheral circuit thereof. The processor 83 may further include another operating circuit, such as a logic-arithmetic unit, an arithmetic unit, or a graphics processing unit.

Figure 4:
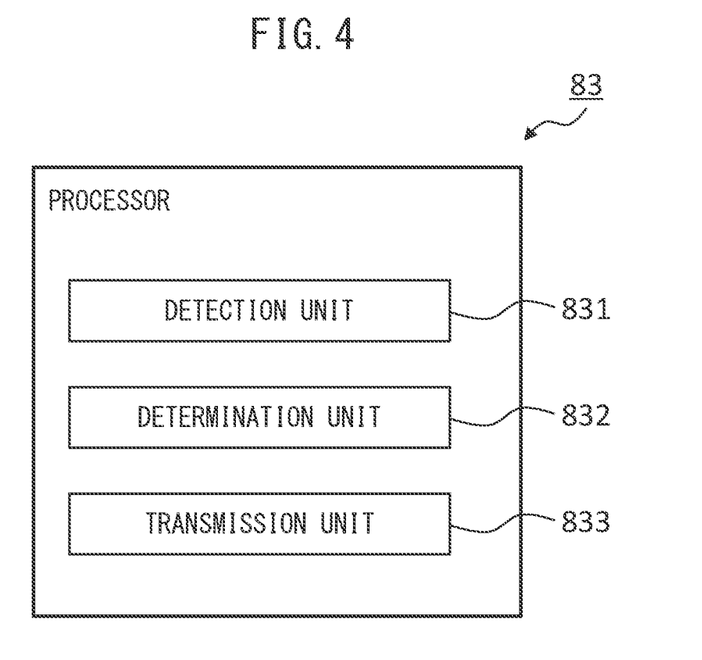
FIG. 4 is a functional block diagram of a processor included in the data transmitter.

FIG. 4 is a functional block diagram of the processor 83 included in the data transmitter 8.

As its functional blocks, the processor 83 of the data transmitter 8 includes a detection unit 831, a determination unit 832, and a transmission unit 833. These units included in the processor 83 are functional modules implemented by a program executed by the processor 83. The computer program for achieving the functions of the units of the processor 83 may be provided in a form recorded on a computer-readable portable storage medium, such as a semiconductor memory, a magnetic medium, or an optical medium. Alternatively, the units included in the processor 83 may be implemented in the data transmitter 8 as separate integrated circuits, microprocessors, or firmware.

The detection unit 831 detects the driver's state from output data of an interior sensor.

The detection unit 831 detects the driver's biological information, such as movement of the driver's looking direction, the open/closed state of the eyelids, and whether the driver is yawning, from a face image generated by the driver monitoring camera 3, which is an example of the interior sensor.

The detection unit 831 detects a face region corresponding to the driver's face by inputting a face image into a classifier that detects a face region from a face image. In addition, the detection unit 831 identifies a region around eyes in the face region supposed to represent the driver's eyes, based on facial structure. The detection unit 831 then detects pupils and corneal reflection images of the light source by template matching of the identified region around eyes with templates representing pupils and corneal reflection images of a light source, and detects the looking direction, based on their positional relationship. The looking direction is expressed as a horizontal angle between the travel direction of the vehicle 1 and the direction in which the driver is looking.

The classifier that detects a face region from a face image may be, for example, a convolutional neural network (CNN) including convolution layers connected in series from the input side toward the output side. A CNN that has been trained using a large number of images including face regions as training data in accordance with a predetermined training technique, such as backpropagation, operates as a classifier that detects a face region. Alternatively, the classifier may be a support vector machine (SVM). A SVM operates as a classifier that detects a face region, by determining a support vector dividing a face region and the other region. Alternatively, the classifier that detects a face region may be an AdaBoost classifier.

The detection unit 831 may detect the open/closed state of the driver's eyelids or mouth by inputting a face image into a classifier that has been trained to detect the open/closed state of eyelids or a mouth.

The classifier that detects the open/closed state of eyelids or a mouth may be a CNN. A CNN that has been trained using a large number of images including regions representing eyelids in the open or closed state and mouths in the open or closed state as training data in accordance with a predetermined training technique, such as backpropagation, operates as a classifier that detects the open/closed state of eyelids or a mouth. Alternatively, the classifier may be a SVM. A SVM operates as a classifier that detects the open/closed state of eyelids or a mouth, by determining a support vector dividing the open and closed states of eyelids or those of a mouth.

The detection unit 831 applies a waking level identification rule stored in the memory 82 to the detected driver's biological information, thereby identifying a waking level as the driver's state. The waking level identification rule is set, for example, so as to associate a waking level with a frequency at which a predetermined action (e.g., quick movement of the looking direction to the outside of a predetermined range, slow blinking, or yawning) is identified from the driver's biological information within a predetermined time range (e.g., the latest 10 minutes).

For example, the detection unit 831 counts the number of times the rate of change in the angle formed between the looking direction and the travel direction of the vehicle 1 from below a predetermined direction angle threshold to above the direction angle threshold exceeds a predetermined rate threshold within the predetermined time range, as the number of times of quick movement of the looking direction to the outside of a predetermined range. The detection unit 831 also counts the number of times the duration of the closed state of the eyelids exceeds a predetermined blinking threshold within the predetermined time range, as the number of times of slow blinking. The detection unit 831 also counts the number of times the duration of the open state of the mouth exceeds a predetermined yawning threshold within the predetermined time range, as the number of yawns.

The detection unit 831 may detect the reclining angle of the driver's seat obtained from the angle sensor, which is an example of the interior sensor, as the driver's state. The detection unit 831 may detect the reclining angle of the seat from a face image. The detection unit 831 can detect the reclining angle of the seat represented in a face image, by template matching of the face image with templates representing a seat at various reclining angles.

The determination unit 832 determines whether the driver's state is suitable for continuing control by the current level of autonomous driving.

The determination unit 832 applies the determination rule stored in the memory 82 to the detected driver's state. For example, when the waking level is detected as the driver's state, the determination unit 832 determines whether the detected waking level exceeds a predetermined waking level threshold included in the determination rule. When the detected waking level exceeds the waking level threshold, the determination unit 832 determines that the driver's state is suitable for continuing control by the current level of autonomous driving. The determination unit 832 may further output a suitability level indicating how much the detected waking level is suitable for continuing the control according to the determination rule.

When the reclining angle of the seat is detected as the driver's state, the determination unit 832 determines whether the detected reclining angle exceeds a predetermined angle threshold included in the determination rule. When the detected reclining angle is less than the angle threshold, the determination unit 832 determines that the driver's state is suitable for continuing control by the current level of autonomous driving. The determination unit 832 may further output a suitability level indicating how much the detected reclining angle is suitable for continuing the control according to the determination rule.

When it is determined that the detected driver's state is suitable for continuing the control, the transmission unit 833 transmits the face image, together with a first setting, to the terminal 101 via the communication interface 81, the data communication module 5, and the communication network NW. The first setting is a setting for displaying the face image on the terminal 101 in first mode.

When it is determined that the detected driver's state is unsuitable for continuing the control, the transmission unit 833 transmits the face image, together with a second setting, to the terminal 101 via the communication interface 81, the data communication module 5, and the communication network NW. The second setting is a setting for displaying the face image on the terminal 101 in second mode that draws more attention of a user of the terminal 101 than the first mode.

Figure 5A:
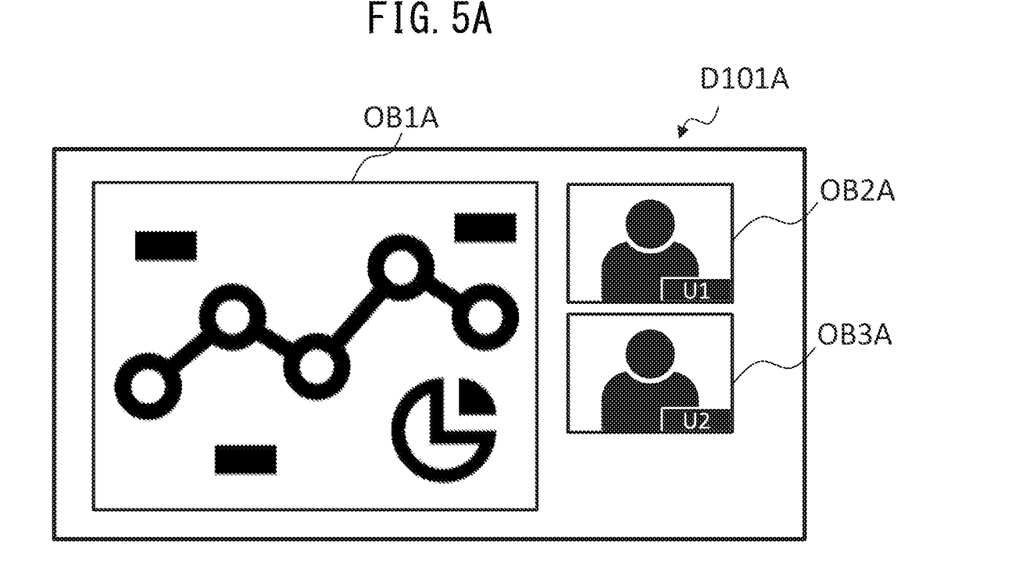
FIG. 5A is an example of a screen displayed on a terminal according to a first setting.
Figure 5B:
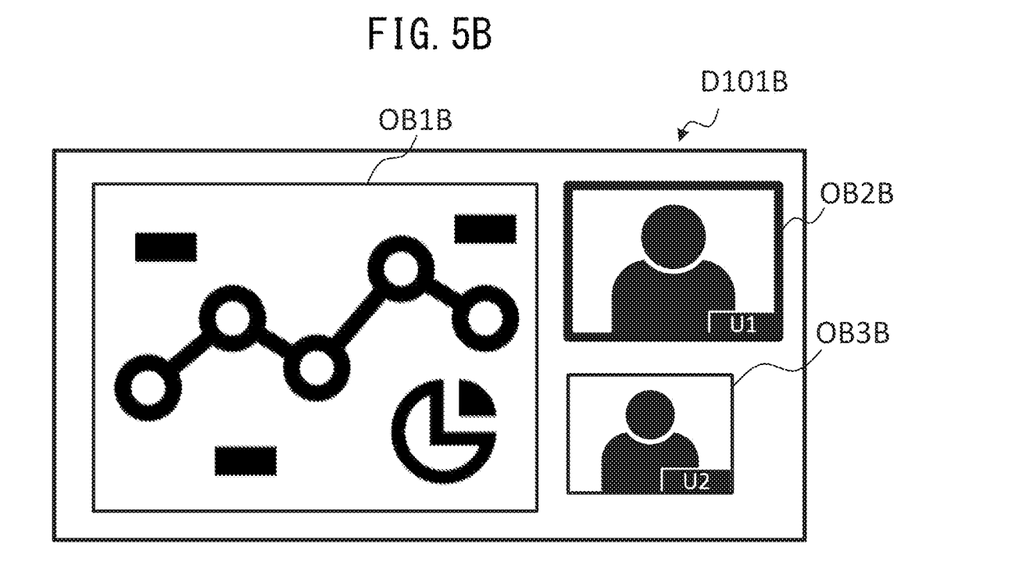
FIG. 5B is an example of a screen displayed on the terminal according to a second setting.

FIG. 5A is an example of a screen displayed on the terminal 101 according to the first setting, and FIG. 5B is an example of a screen displayed on the terminal 101 according to the second setting.

A screen D101A illustrated in FIG. 5A includes objects OB1A, OB2A, and OB3A as displayed objects. The object OB1A is an image generated by application software executed by the terminal 101, and is an example of an application screen object. The object OB2A is a face image representing the face of the driver of the vehicle 1 and generated by the driver monitoring camera 3, and is an example of a participant image object. The object OB3A is a face image representing the face of the user of the terminal 101 and generated by a camera (not illustrated) connected to the terminal 101, and is an example of a participant image object.

The terminal 101 generates the screen D101A in which the objects OB1A-OB3A are disposed according to a standard screen layout, which is one of screen layouts preset by videoconference software, and the first setting, and displays it on its display. For example, the standard screen layout is set so that the application screen object is disposed in an area extending from the upper left of the screen and having 85% of the height and 60% of the width of the whole screen, and that the participant image objects are disposed in order from the upper right toward the lower right of the screen and each have 30% of the height and 25% of the width of the whole screen. Further, the standard screen layout is set so that the application screen object and the participant image objects each have a 1.5-point-thick outline. The first setting specifies that in the generated screen D101A the object OB2A (driver's face image) is to be displayed in a size and with an outline applied to a participant image object in the screen layout used for displaying on the display (first mode). Transmitting the driver's face image to the terminal 101 together with the first setting includes transmitting the driver's face image to the terminal 101 without specifying display mode.

A screen D101B illustrated in FIG. 5B includes objects OB1B, OB2B, and OB3B as displayed objects. Since the objects OB1B-OB3B are similar to the objects OB1A-OB3A, respectively, detailed description thereof is omitted herein.

The terminal 101 generates the screen D101B in which the objects OB1B-OB3B are disposed according to the standard screen layout and the second setting, and displays it on its display. The second setting is set for displaying the driver's face image in a greater (e.g., 1.3 times greater) size and with a thicker (e.g., three times thicker) outline than the size and the outline applied to a participant image object in the screen layout used for displaying on the display (second mode) so that the driver's face image draws more attention of the user of the terminal 101 than in the first mode.

As the screen layout for displaying on the display, the user of the terminal 101 may use a list screen layout in which only a participant list is displayed without a participant image object (with an object displayed in size 0). In the first setting in this case, the driver's face image is not displayed (first mode) according to the list screen layout. In the second setting, since the display size of a participant image object is 0 in the currently used screen layout (list screen layout), the display size of the driver's face image based on the ratio to the display size of the participant image object (e.g., 1.3 times) is 0, and thus cannot be made greater than the size applied to the participant image object. In the second setting in this case, a predetermined size (e.g., the size applied to a participant image object in the standard screen layout) may be used as the display size of the driver's face image.

The transmission unit 833 may transmit the driver's face image to the terminal 101 via the videoconference server 102. The videoconference server 102 that has received the driver's face image from the data transmitter 8 transmits the received driver's face image to terminals participating in a predetermined videoconference, which include the terminal 101, via the communication network NW.

When the determination unit 832 outputs a suitability level of the driver's state, the transmission unit 833 may further transmit, to the terminal 101, level data for displaying the suitability level on the terminal 101. For example, the transmission unit 833 generates an embedded face image obtained by superposing an image of a character string indicating the suitability level as the level data on the face image, and transmits the embedded face image to the terminal 101. In this case, the terminal 101 displays the embedded face image on its display to display the suitability level. The transmission unit 833 may transmit the level data indicating the suitability level, together with the face image, to the terminal 101. In this case, the terminal 101 displays an image of a character string indicating the suitability level corresponding to the level data (e.g., on or near the face image) so that association with the face image can be seen.

Figure 6:
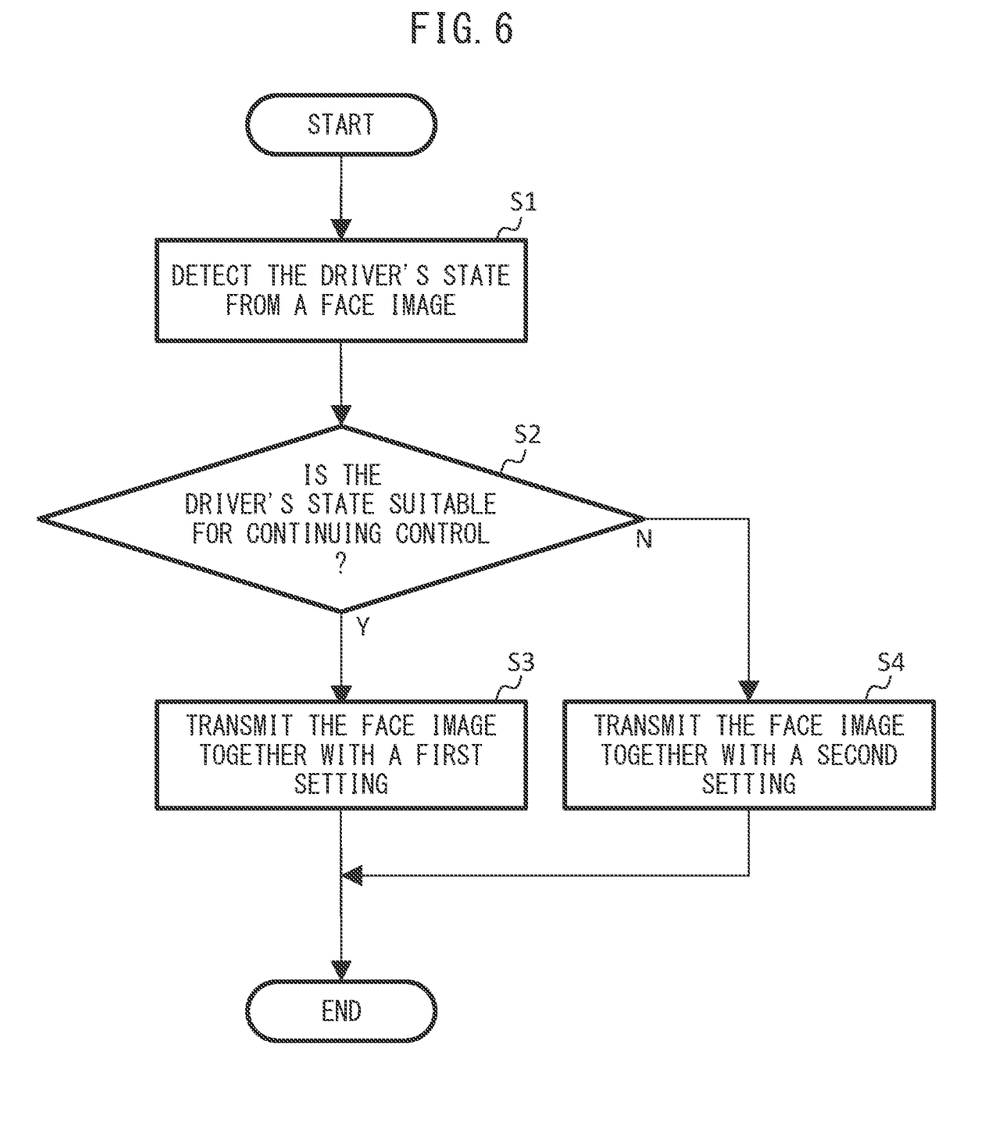
FIG. 6 is a flowchart of a data transmission process.

FIG. 6 is a flowchart of a data transmission process. The processor 83 of the data transmitter 8 executes the data transmission process described below at predetermined intervals (e.g., intervals of 1/30 seconds) while the driver is participating in a videoconference and the vehicle 1 is driven by a level of autonomous driving in which the driver need not be alert.

First, the detection unit 831 of the processor 83 of the data transmitter 8 detects the driver's state from a face image obtained from the driver monitoring camera 3, which is an example of the interior sensor (step S1).

Subsequently, the determination unit 832 of the processor 83 determines whether the detected driver's state is suitable for continuing control by a level of autonomous driving in which the driver need not be alert (step S2).

When it is determined that the driver's state is suitable for continuing the control (Yes in step S2), the transmission unit 833 of the processor transmits the face image to the terminal 101 communicably connected via the communication network NW, together with a first setting for displaying the face image on the terminal 101 in first mode (step S3), and terminates the data transmission process.

When it is determined that the driver's state is unsuitable for continuing the control (No in step S2), the transmission unit 833 of the processor transmits the face image to the terminal 101 communicably connected via the communication network NW, together with a second setting for displaying the face image on the terminal 101 in second mode (step S4), and terminates the data transmission process.

By executing the data transmission process in this way, the data transmitter 8 can appropriately inform the terminal 101 of the driver's condition during travel by autonomous driving. For example, when the driver's state is no longer suitable for continuing autonomous driving control during the driver's videoconference as a secondary activity, the data transmitter 8 transmits the driver's face image to the terminal 101 used by another participant in the videoconference, together with the second setting for displaying the face image in second mode that draws more attention. The participant looking at the face image in the second mode can call the driver's attention, using the videoconference. The driver who has been warned can return to a state suitable for continuing autonomous driving control, and continue travel by autonomous driving more appropriately.

It should be noted that those skilled in the art can make various changes, substitutions, and modifications without departing from the spirit and scope of the present disclosure.

What is claimed is:

1. A data transmitter to be mounted on a vehicle under travel control by a level of autonomous driving in which a driver need not be alert, the data transmitter comprising a processor configured to:
   detect the driver's state from output data of an interior sensor mounted on the vehicle, the interior sensor including a camera that outputs a face image representing the driver's face;
   determine whether the driver's state is suitable for continuing the control by the level of autonomous driving;
   transmit, when it is determined that the state is suitable for continuing the control, the face image to a terminal communicably connected via a communication network, together with a first setting for displaying the face image on the terminal in first mode; and
   transmit, when it is determined that the state is unsuitable for continuing the control, the face image to the terminal, together with a second setting for displaying the face image on the terminal in second mode that draws more attention of a user of the terminal than the first mode.

2. The data transmitter according to claim 1, wherein the processor
   further outputs a suitability level indicating how much the state is suitable for continuing the control, in the determination, and
   further transmits, to the terminal, level data for displaying the suitability level on the terminal, in the transmission.

3. The data transmitter according to claim 1, wherein in the detection, the processor detects a looking direction or a face orientation of the driver from the face image, determines a waking level of the driver, based on the looking direction or the face orientation, and detects the state, depending on the waking level.

4. A method for data transmission executed by a data transmitter mounted on a vehicle under travel control by a level of autonomous driving in which a driver need not be alert, the method comprising:
   detecting the driver's state from output data of an interior sensor mounted on the vehicle, the interior sensor including a camera that outputs a face image representing the driver's face;
   determining whether the driver's state is suitable for continuing the control by the level of autonomous driving;
   transmitting, when it is determined that the state is suitable for continuing the control, the face image to a terminal communicably connected via a communication network, together with a first setting for displaying the face image on the terminal in first mode; and
   transmitting, when it is determined that the state is unsuitable for continuing the control, the face image to the terminal, together with a second setting for displaying the face image on the terminal in second mode that draws more attention of a user of the terminal than the first mode.

5. A non-transitory computer-readable medium storing a computer program for data transmission causing a computer mounted on a vehicle to execute a process, the vehicle being under travel control by a level of autonomous driving in which a driver need not be alert, the process comprising:
   detecting the driver's state from output data of an interior sensor mounted on the vehicle, the interior sensor including a camera that outputs a face image representing the driver's face;
   determining whether the driver's state is suitable for continuing the control by the level of autonomous driving;
   transmitting, when it is determined that the state is suitable for continuing the control, the face image to a terminal communicably connected via a communication network, together with a first setting for displaying the face image on the terminal in first mode; and
   transmitting, when it is determined that the state is unsuitable for continuing the control, the face image to the terminal, together with a second setting for displaying the face image on the terminal in second mode that draws more attention of a user of the terminal than the first mode.

* * * * *